United States Patent Office 3,441,616
Patented Apr. 29, 1969

3,441,616
PROCESS FOR RECOVERY OF POLYETHER POLYOLS FROM POLYURETHANE REACTION PRODUCTS
Louis C. Pizzini, Trenton, and John T. Patton, Jr., Wyandotte, Mich., assignors to Wyandotte Chemicals Corporation, Wyandotte, Mich., a corporation of Michigan
No Drawing. Filed Nov. 7, 1966, Ser. No. 592,311
Int. Cl. C07c 43/26, 43/22
U.S. Cl. 260—615                                6 Claims

ABSTRACT OF THE DISCLOSURE

Polyether polyols may be recovered from polyether-based polyurethane reaction products by hydrolyzing said products in a water/dimethylsulfoxide medium followed by extracting the polyols from said medium with an organic solvent immiscible with said medium.

---

The present invention relates to a novel process for the treatment of polyether-based polyurethane reaction products whereby the polyether polyols employed in the preparation of the products are recovered in substantially quantitative yields. More particularly, the present invention relates to the recovery of certain polyether polyols from polyether-based polyurethane reaction products by hydrolyzing said products in a water/dimethylsulfoxide medium followed by extracting the polyols from said medium with certain selective solvents.

Polyurethane reaction products are well established in the art today. They are generally prepared by the reaction of an organic polyisocyanate with an organic compound containing at least two hydroxyl groups. Other ingredients such as blowing or foaming agents, chain-extending agents, surfactants, catalysts, fillers, and pigments may also be employed. Depending upon the particular ingredients employed, a variety of products including foams, elastomers, coatings, fibers and sealants may be obtained. All of these products, and particularly foams, are within the scope of the present invention. The term "polyurethane" as used in the specification and claims is intended to include those products prepared from an organic polyisocyanate and an organic compound containing at least two hydroxyl groups as well as those prepared from an organic polyisocyanate, an organic compound containing at least two hydroxyl groups and polyamines. The latter products are also referred to in the art as polyurethane-ureas.

One particularly preferred group of organic compounds containing at least two hydroxyl groups which are employed in the preparation of polyurethanes are polyether polyols. These compounds are generally prepared by the condensation of one or more alkylene oxides with a compound having at least two active hydrogen atoms. It is those products prepared from these polyols to which the present invention is directed.

It has recently been reported that polyurethane foam producers lose about 30% of the polyurethane foam in waste (Oil, Paint, & Drug Reporter, July 1965, page 39). Thus, an economical, efficient process for the recovery of polyether polyols from waste polyether-based polyurethane foam is of definite importance to the art.

Accordingly, an object of the present invention is to provide an economic, efficient process for the recovery of polyether polyols from polyether-based polyurethane reaction products. A further object of the present invention is to provide a process for the recovery of polyether polyols from polyether-based polyurethane foams. These and other objects of the invention will be apparent from the specifications and examples which follow.

The above objects are accomplished in accordance with the present invention by a process which comprises (1) hydrolyzing a polyether-based polyurethane reaction product with a strong base in a medium of water and dimethylsulfoxide at elevated temperatures; (2) extracting the polyether polyol resulting from (1) with an organic solvent which is immiscible with the water/dimethylsulfoxide medium; (3) separating the extract from (2) from the water/dimethylsulfoxide medium; and (4) distilling the organic solvent from the separated extract whereby substantially pure polyether polyol is obtained. The crux of the present invention resides in the use of the base/water/dimethylsulfoxide medium for the hydrolysis.

As mentioned above, the polyurethane reaction products which may be subjected to the treatment of the present invention are those prepared from polyether polyols. The polyether polyols which are employed in the preparation of these products are characterized by equivalent weights of at least about 400. They are generally prepared by the catalytic condensation of one or more alkylene oxides having at least three carbon atoms with an initiator which is an organic compound having at least two active hydrogen atoms. If more than one alkylene oxide is used, they may be condensed with the initiator either simultaneously or sequentially. The lower alkylene oxides such as propylene oxide and butylene oxide are preferred. Those polyether polyols prepared from ethylene oxide, because of their water solubility, are not recoverable by the process of the present invention; however, those polyols prepared from mixtures of ethylene oxide and other oxides may be recovered in accordance with the present invention as long as the ethylene oxide content of the polyols is less than about 20% based on the total weight of the polyol.

As mentioned above, the polyether polyols are prepared by condensing alkylene oxides or a mixture thereof, either simultaneously or sequentially, with an initiator. Illustrative initiators include polyhydric alcohols such as ethylene glycol, propylene glycol, the isomeric n-butylene glycols, 1,5-pentane diol, 1,6-hexane diol, glycerol, trimethylolpropane, 1,2,6-hexane triol, sorbitol, sucrose, α-methyl glucoside and pentaerythritol. Other useful compounds include organic acids such as adipic acid, succinic acid, aconitic acid and trimellitic acid; inorganic acids such as the phosphoric acids; amines such as methyl amine, ethyl amine, ethylene diamine, diethylene triamine, toluene diamine, aniline, methylene dianiline, piperazine and triisopropanol amine; phenolic compounds such as bisphenol, pyrogallol, resorcinol, inositol; mercaptans such as 1,2-ethanedithiol and 1,2,3-propanetrithiol; and acid amides such as acetamide and benzene sulfonamide. Mixtures of any of the above may also be employed.

In the first step of the process of the present invention, a polyether-based polyurethane reaction product is hydrolyzed with a strong base in a medium of water and dimethylsulfoxide at elevated temperatures. Any standard strong base may be employed. Representative bases include alkali metal oxides and hydroxides such as sodium oxide, sodium hydroxide, potassium oxide and potassium hydroxide; alkali earth metal oxides and hydroxides such as calcium oxide, calcium hydroxide, magnesium oxide and magnesium hydroxide; and various amines. Generally about 0.1 part to 10 parts of base per part of polyurethane reaction product will be employed. From about one to six parts of base are preferred since these amounts speed up the hydrolysis reaction and insure complete salting out of the polyol from the water/dimethylsulfoxide medium. The hydrolysis is generally conducted for about one to ten hours at reflux temperatures, although as little time as ten minutes may be employed, if desired. The temperature of the hydrolysis will usually be from 100° C. to 190° C., preferably from about 110° C. to 150° C., the exact temperature being dependent upon the ratio of water to dimethylsulfoxide employed in the hydrolysis medium. The hydrolysis is generally conducted at atmospheric pressure, although superatmospheric pressure may be employed, if desired.

It is instrumental to the present invention that the hydrolysis medium comprise water and dimethylsulfoxide. The ratio of water to dimethylsulfoxide may vary considerably. Generally, the medium will comprise, based on 100 parts, about 10 to 90 parts of dimethylsulfoxide, the remaining parts being water. Equal parts of water and dimethylsulfoxide represent the preferred amounts. It is surprising and unexpected that the use of a water/dimethylsulfoxide medium results in such quantitative yields of polyether polyols, particularly since known hydrolysis media such as alcohol, N,N-dimethylformamide and mixtures of these with water do not provide for the quantitative recovery of polyether polyols from polyether-based polyurethane reaction products.

In the second step of the present invention, an organic solvent in which the polyol is soluble and which is immiscible with the water/dimethylsulfoxide hydrolysis medium is employed to extract the polyether polyol from the hydrolysis medium. Those organic solvents which may be employed in the present invention include the liquid paraffinic hydrocarbons such as pentane, hexane, heptane, octane, nonane, decane, dodecane, pentadecane, octadecane and mixtures of these, commonly known as petroleum ether, ligroin, gasoline, and kerosene. After the polyol is extracted by the organic solvent, the organic extract is separated from the water/dimethylsulfoxide medium and the separated extract is then subjected to distillation to strip off the organic solvent. Other conventional means of isolating the polyol from the organic solvent may be employed, if desired.

The following examples serve to illustrate the invention. All parts are by weight unless otherwise specified.

EXAMPLE I

A flexible polyurethane foam was prepared from the following.

| Ingredients: | Parts by weight |
|---|---|
| A 3000 molecular weight (1000 equivalent weight) polyether polyol based on propylene oxide and glycerine (OH #56.1) | 100 |
| Water | 3.5 |
| Silicone surfactant | 1.2 |
| Amine catalyst | 0.3 |
| Di-octylphthalate | 0.6 |
| N-ethylmorpholine | 0.15 |
| Stannous octoate | 0.2 |
| Tolylene diisocyanate (80/20 2,4/2,6 isomers) | 46.9 |

The above foam (10.2 parts) was charged to a reaction vessel and a solution of 60 parts of potassium hydroxide dissolved in 150 parts of distilled water and 150 parts of dimethylsulfoxide was then added to the foam. The reaction mixture was then refluxed at about 120° C. to 125° C. for a total of five hours. The foam disintegrated rapidly and after about fifteen minutes of refluxing, the reaction mixture was observed to contain essentially no solid particles. After completion of the reflux period, the mixture was cooled and extracted three times, each time with 100 parts of petroleum ether (B.P. 30° C. to 60° C.). The petroleum ether layer was then separated from the water/dimethylsulfoxide phase. The petroleum ether extracts were then combined and the petroleum ether was stripped off. A clear yellow oil (6.63 parts, theory 6.68 parts) was obtained. The hydroxyl number of the oil obtained was 60.1 and the infra-red spectrum was consistent with that of the 3000 molecular weight polyol employed in the preparation of the polyurethane foam.

Thus by the process of the present invention, an essentially theoretical amount (99%) of polyether polyol was recovered from the polyurethane-urea foam.

EXAMPLE II (A) Following the procedure of Example I, 5.67 parts of the same polyurethane foam was refluxed with a mixture of 60 parts of potassium hydroxide, 150 parts of water, and 150 parts of ethanol. A large amount of foam particles remained even after refluxing the reaction mixture for four hours. Thus, hydrolysis of the polyurethane foam was incomplete using a base/water/alcohol mixture and, therefore, at best, only part of the polyether polyol could be recovered.

(B) Following the procedure of Example I, ten parts of the same polyurethane foam was added to a mixture of 60 parts of potassium hydroxide, 150 parts of water, and 150 parts of N,N-dimethylformamide. A distinct amine aroma was immediately detected. Investigation indicated that N,N-dimethylformamide is not stable in the alkaline medium and disintegrates to yield dimethylamine. Thus, a base/water/N,N-dimethylformamide medium is not a suitable medium for the hydrolysis of polyurethane foams.

This example demonstrates the uniqueness associated with the dimethylsulfoxide/water medium for the hydrolysis of polyurethane foams. Both alcohol/water and N,N-dimethylformamide/water, two standard hydrolysis media, proved ineffective for the hydrolysis of polyurethane foams.

EXAMPLE III

The procedure of Example I was duplicated with the single exception that 60 parts of sodium hydroxide was employed in lieu of potassium hydroxide. As in Example I, an essentially theoretical amount of polyether polyol was recovered.

EXAMPLE IV

The procedure of Example I was duplicated with the single exception that the polyol employed in the preparation of the foam was a 3000 molecular weight (1000 equivalent weight) polyether polyol based on butylene oxide and glycerine. As in Example I, an essentially theoretical amount of polyol was recovered.

EXAMPLE V

Following the procedure of Example I, various polyether polyols are recovered from polyurethane foams employing equal parts of water and dimethylsulfoxide as the hydrolysis medium and kerosene as the extractor. In all cases, an essentially theoretical amount of polyol is obtained. The polyols recovered are:

(a) A 400 equivalent weight polyether polyol prepared from glycerine and propylene oxide.
(b) A 500 equivalent weight polyether polyol prepared from glycerine and propylene oxide.
(c) A 1000 equivalent weight polyether polyol prepared from propylene glycol and propylene oxide.
(d) A 400 equivalent weight polyether polyol prepared from propylene glycol and propylene oxide.

EXAMPLE VI

Following the procedure of Example I, ten parts of the same foam was refluxed (110° C.–115° C.) for about eight hours with a mixture of 60 parts of potassium hydroxide, 150 parts of water and 37.5 parts of dimethylsulfoxide (80/20 water/dimethylsulfoxide ratio). Extraction of the polyether polyol with petroleum ether results in an 85% recovery of the starting polyether polyol.

This example was duplicated using a water/dimethylsulfoxide ratio of 10/90. The foam disintegrated rapidly. Substantially quantitative yields of polyether polyol are obtained.

EXAMPLE VII

Following the procedure of Example I, ten parts of the same foam was refluxed in a mixture of one part of potassium hydroxide, 17.5 parts of water and 150 parts of dimethylsulfoxide (90/10 dimethylsulfoxide/water ratio). Extraction with petroleum ether resulted in 5.7 parts of polyol (87% yield). When small amounts of base are employed such as in this example, it is expedient to add salt to the reaction mixture prior to the extractions. This provides for a better separation of the polyol from the dimethylsulfoxide/water medium.

EXAMPLE VIII

A flexible foam was prepared from the same ingredients and amounts thereof as described in Example I with the exception that 100 parts of a 4500 molecular weight (1500 equivalent weight) polyether polyol prepared by capping with ethylene oxide a propylene oxide adduct of trimethylolpropane and 41.7 parts of tolylene diisocyanate were substituted for the reactants employed in Example I.

The foam was then treated in the same manner as described in Example I. A clear yellow oil (5.4 parts, 80% of theory) was obtained. The hydroxy number of the oil and the infra-red spectrum were consistent with that of the polyol employed in the preparation of the foam.

EXAMPLE IX

A polyurethane foam was prepared from the following:

| Ingredients: | Parts by weight |
| --- | --- |
| A 1320 equivalent weight polyol (OH#42.5) having 10% ethylene oxide chemically combined in its structure prepared by condensing a mixture of ethylene oxide and propylene oxide with a 450 molecular weight addition product of propylene oxide and glycerine | 100 |
| Water | 4.8 |
| Halogenated hydrocarbon | 3 |
| Silicone surfactant | 2 |
| Amine catalyst | 0.1 |
| Stannous octoate | 0.25 |
| Tolylene diisocyanate | 55.7 |

Ten parts of the above foam was treated in the manner described in Example I. A substantially quantitative yield of polyol was recovered. The hydroxyl number and the infra-red spectrum were consistent with that of the starting polyol.

EXAMPLE X

A polyurethane reaction product having an unreacted isocyanate content of 6.97% prepared by the reaction of 21.2 parts of tolylene diisocyanate and 39.4 parts of a 3000 molecular weight polyether polyol based on glycerine and propylene oxide and 39.4 parts of a 2000 molecular weight polypropylene glycol was subjected to the treatment described in Example I. Extraction with petroleum ether resulted in 72.5 parts (92% of theory) of the polyol blend.

What is claimed is:

1. A process for the recovery of a polyether polyol obtained by condensing an initiator selected from the group consisting of ethylene glycol, propylene glycol, butylene glycol, 1,5-pentane diol, 1,6-hexane diol, glycerol, trimethylolpropane, 1,2,6-hexane triol, sorbitol, and pentaerythritol with a member of the group consisting of propylene oxide, butylene oxide, mixtures of propylene oxide with ethylene oxide, and mixtures of butylene oxide with ethylene oxide, said mixtures containing at least 80% by weight of propylene oxide or butylene oxide, said polyol having an equvilent weight of at least about 400 from a polyurethane reaction product of said polyether polyol comprising (1) hydrolyzing at a temperature between 100° C. and 190° C. for about ten minutes to ten hours said polyurethane reaction product in the presence of from 0.1 part to 10 parts per part of said reaction product of a strong base selected from the group consisting of alkali metal oxides, alkali metal hydroxides, alkali earth metal oxides, and alkali earth metal hydroxides in a water/dimethylsulfoxide medium; and (2) extracting the polyether polyol resulting from (1) with a liquid paraffinic hydrocarbon which is immiscible with said medium.

2. The process of claim 1 which comprises the additional steps of separating the organic layer resulting from (2) from the hydrolysis medium and stripping off the organic solvent therefrom whereby a polyether polyol is obtained in substantially quantitative yields.

3. The process of claim 1 when the polyurethane reaction product is a foam.

4. The process of claim 1 when the base is potassium hydroxide.

5. The process of claim 1 when the hydrolysis medium comprises equal parts of water and dimethylsulfoxide.

6. The process of claim 1 when the liquid paraffinic hydrocarbon is petroleum ether.

References Cited

UNITED STATES PATENTS 3,042,666    7/1962    Bentles.
3,225,094    12/1965    Wolf    260—453 XR

FOREIGN PATENTS 224,935    9/1959    Australia.

LEON ZITVER, *Primary Examiner.*

H. MARS, *Assistant Examiner.*

U.S. Cl. X.R.

260—613, 209, 210, 485, 475, 953, 584, 573, 570, 268, 609, 561, 556